Patented Aug. 28, 1945

2,383,458

UNITED STATES PATENT OFFICE 2,383,458

ANTIMALARIAL AND PROCESS FOR MAKING THE SAME

Morris Eli Auerbach, Albany, N. Y., assignor to Winthrop Chemical Company, Inc., New York, N. Y., a corporation of New York No Drawing. Application August 28, 1943, Serial No. 500,389

4 Claims. (Cl. 260—279)

This invention relates to a readily-soluble, heat-sterilizable derivative of 3-chloro-7-methoxy-9-(δ-diethylamino-α-methylbutylamino)-acridine displaying anti-parasitic properties, especially against malaria parasites, and to a process for making said derivative.

For some purposes, as for the preparation of solutions intended for parenteral injection, it is desirable to have an anti-malarial agent which is highly soluble in water, as stable as possible in aqueous media, and capable of heat-sterilization without fusion, but as far as I am aware no previously known anti-malarial agent possesses all of these desirable characteristics. The dihydrochloride of 3-chloro-7-methoxy-9-(δ-diethylamino-α-methylbutylamino) - acridine can be sterilized at 110° C. without fusion and is comparatively stable in hot aqueous solution, but it is soluble in water at 25° C. only to the extent of 4.2% by weight. On the other hand the salts of 3-chloro-7-methoxy-9-(δ-diethylamino-α-methylbutylamino)-acridine with methane-sulfonic acid and with lactic acid, while highly water-soluble, soften or fuse under the conditions of heat-sterilization, forming glasses or compact masses of undesirable physical appearance, and relatively difficult to dissolve, as compared to the same compounds in granular form. The dilactate is also objectionable because of its instability in water, i. e., it is hydrolyzed fairly readily.

According to the present invention, I have prepared by the interaction, in a suitable solvent, of 3-chloro-7-methoxy-9-(δ-diethylamino-α-methylbutylamino)-acridine with sulfamic acid a salt having the following formula:

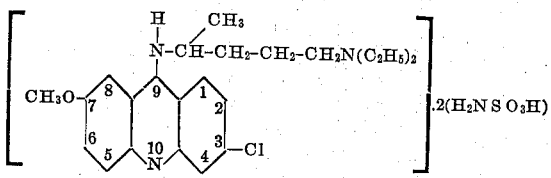

This compound is readily soluble in water, 33% by weight at 25° C.; remains unsoftened and unfused under conditions of heat-sterilization; and is at least as stable in boiling water as the corresponding dihydrochloride.

The invention is illustrated by the following example without being restricted thereto:

Example 3.84 grams (0.04 mole) of sulfamic acid are dissolved in 10 ml. of warm distilled water. This solution is added, with stirring, to a solution of 8.2 grams (0.0206 mole) of 3-chloro-7-methoxy-9-(δ-diethylamino-α-methylbutylamino)-acridine in 100 ml. of acetone. After stirring the reaction mixture for thirty minutes, the solid, 3-chloro-7-methoxy-9-(δ-diethylamino-α-methylbutylamino)-acridine disulfamate, is collected and dried at 60° C. It has M. P. 151–153° C.

The preparation as given above can be modified by the substitution of other neutral water-miscible organic solvents, such as alcohol or dioxane, instead of acetone.

I claim as my invention:

1. 3-chloro-7-methoxy-9-(δ-diethylamino-α-methylbutylamino)-acridine disulfamate having the formula

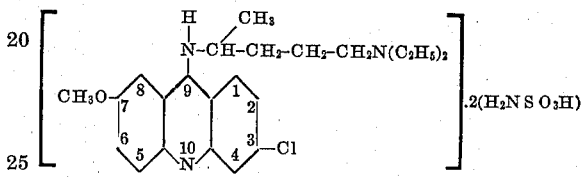

melting at approximately 151–153° C., and being readily soluble in water.

2. A water-soluble salt of 3-chloro-7-methoxy-9-(δ-diethylamino-α-methylbutylamino)-acridine with sulfamic acid.

3. As a new agent for combatting parasites, a highly stable, readily water-soluble compound which is heat-sterilizable without substantial alteration, said compound being a salt of 3-chloro-7-methoxy-9-(δ-diethylamino-α-methylbutylamino)-acridine with sulfamic acid.

4. As a new agent for combatting parasites, a highly stable, readily water-soluble compound which is heat-sterilizable without substantial alteration, said compound being 3-chloro-7-methoxy-9-(δ-diethylamino-α-methylbutylamino)-acridine disulfamate having the formula

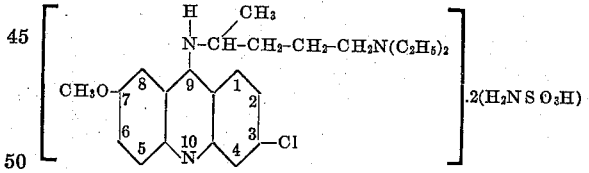

MORRIS ELI AUERBACH.